United States Patent [19]

Yamada et al.

[11] Patent Number: 4,987,939
[45] Date of Patent: Jan. 29, 1991

[54] HEAVY DUTY PNEUMATIC RADIAL TIRES WITH CARCASS PLIES COMPOSED OF AROMATIC POLYETHERAMIDE CORDS

[75] Inventors: Shigeki Yamada; Motoaki Taniguchi, both of Tokyo; Masanobu Takahashi, Iruma; Kenshiro Kato, Kodaira, all of Japan

[73] Assignee: Bridgestone Corporation, Tokyo, Japan

[21] Appl. No.: 320,835

[22] Filed: Mar. 8, 1989

Related U.S. Application Data

[63] Continuation of Ser. No. 906,053, Sep. 11, 1986, abandoned.

[30] Foreign Application Priority Data

Sep. 13, 1985 [JP] Japan .................. 60-203180

[51] Int. Cl.$^5$ .............................................. B60C 9/02
[52] U.S. Cl. ...................................... 152/556; 57/902; 152/451; 152/564
[58] Field of Search ............... 152/451, 556, 548, 527, 152/564, 537; 57/902; 528/185

[56] References Cited

U.S. PATENT DOCUMENTS

| | | | |
|---|---|---|---|
| 3,505,288 | 4/1970 | Bodesheim et al. | 528/185 X |
| 3,746,669 | 7/1973 | Dunnom et al. | 152/547 X |
| 4,410,684 | 10/1983 | Nelb, II et al. | 528/185 |
| 4,445,560 | 5/1984 | Musy | 152/527 X |
| 4,505,100 | 3/1985 | Yoshiyuki et al. | 57/207 |

FOREIGN PATENT DOCUMENTS

| | | | |
|---|---|---|---|
| 3318059 | 11/1984 | Fed. Rep. of Germany | 152/564 |
| 2212243 | 7/1974 | France . | |
| 49-31041 | 8/1974 | Japan | 152/537 |
| 60-110918 | 6/1985 | Japan . | |
| 1166845 | 10/1969 | United Kingdom . | |

Primary Examiner—Caleb Weston
Assistant Examiner—Geoffrey L. Knable
Attorney, Agent, or Firm—Sughrue, Mion, Zinn, Macpeak & Seas

[57] ABSTRACT

A heavy duty radial tire comprises a tread portion, a pair of sidewall portions, a pair of bead portions, a carcass of at least two plies and a breaker, wherein each ply is composed of cords of aromatic copolyamide fiber having particular units A and B and a specific rubber composition having 100% modulus of 35–50 kg/cm$^2$.

1 Claim, 2 Drawing Sheets

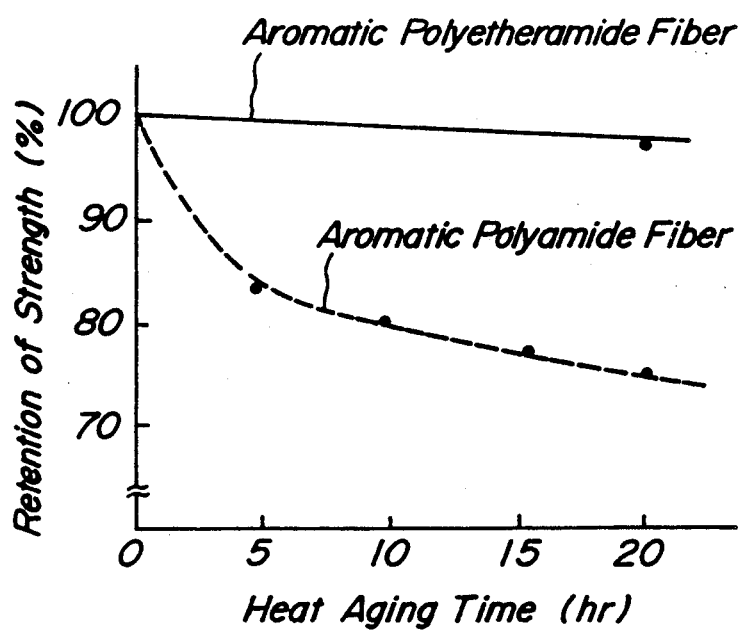
FIG_1
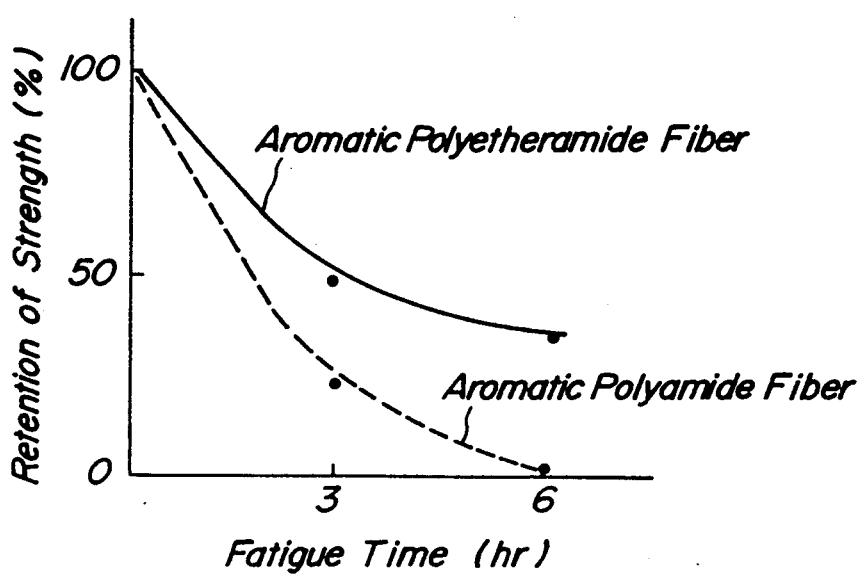
FIG_2

FIG_3
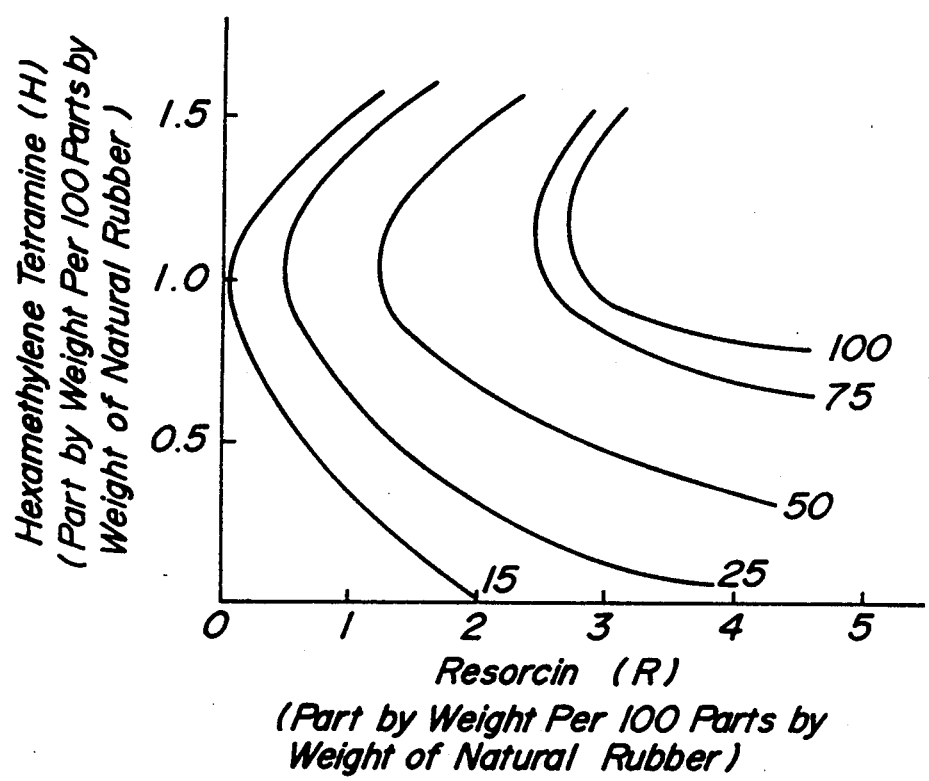

HEAVY DUTY PNEUMATIC RADIAL TIRES WITH CARCASS PLIES COMPOSED OF AROMATIC POLYETHERAMIDE CORDS

This is a continuation of application Ser. No. 906,053 filed Sept. 11, 1986, now abandoned.

BACKGROUND OF THE INVENTION

1. Field of the Invention

This invention relates to heavy duty pneumatic radial tires, and more particularly to a pneumatic radial tire for airplanes having a considerably improved service life by improving the durability of carcass ply.

2. Related Art Statement

Lately, it is demanded to reduce the weight of airplane body in accordance with the demand of energy-saving, and hence it is also strongly demanded to reduce the weight of airplane tire.

Heretofore, it was particularly effective to change a bias structure carcass of the tire into a radial structure carcass as a means for realizing the weight reduction, whereby the number of carcass plies can be decreased to reduce the weight. Furthermore, the use of high strength cord material was effective to reduce the weight of the tire. As a material for such a cord, there is typically an aromatic polyamide fiber.

Since the airplane tires are used under a high loading condition, they are largely deformed to cause a considerable heat build-up. Therefore, they are strongly required to have fatigue resistance of cord strength in the casing and adhesion durability between cord and rubber.

Especially, since the innermost ply constituting the carcass composed of plural plies is subjected to a compressive strain, when the aromatic polyamide fiber having a high modulus of elasticity is applied to a cord for the innermost ply, the resulting cord becomes fatigued due to the compressive strain and the rupture strength decreases, so that satisfactory service durability as the airplane tire can not be maintained. Moreover, the aromatic polyamide fiber is originally low in the adhesion to rubber as compared with the case of nylon or polyester fiber, so that the adhesion force at the shoulder portion is considerably decreased due to the heat build-up, whereby it is apt to cause a separation failure between plies in the belt, while in the bead portion near rim line, the input is very large and the heat build-up is large, so that the adhesion breakage at the boundary between cord and rubber in such a portion is liable to be caused, and consequently sufficient performances as the carcass can not be obtained from a viewpoint of adhesion durability.

As mentioned above, the reduction of weight in the airplane tire by the method of using the conventional high strength aromatic polyamide fiber has drawbacks such as fatigue of strength and degradation of adhesion force, so that the weight reduction of heavy duty pneumatic radial tire can not be realized with the holding of sufficient durability by the above method.

SUMMARY OF THE INVENTION

The inventors have made various studies in order to solve the aforementioned problems and found out that the above problems can be solved by using aromatic copolyamide fiber as a material for cord and natural rubber series composition having a particular resorcin-hexamethylenetetramine-silica system as a coating rubber, and as a result the invention has been accomplished.

According to the invention, there is the provision of a heavy duty pneumatic radial tire comprising a tread portion, a pair of sidewall portions extending between both shoulders of the tread portion, a pair of bead portions each formed at the inner end of the sidewall portion, and a reinforcement consisting of a carcass composed of at least two plies each containing cords arranged in the radial direction of the tire, which plies being wound around the bead portion from inside toward outside, and a breaker surrounding around the carcass, characterized in that said ply is composed of (A) cords each made from a fiber of aromatic copolyamide consisting of a unit A represented by the following formula:

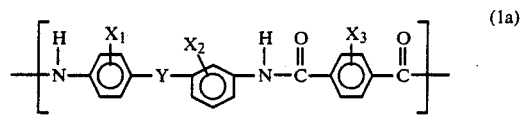
(1a)

, wherein $X_1$, $X_2$ and $X_3$ are a hydrogen atom or an alkyl group having a carbon number of 1-3, respectively, and Y is —O—, —S— or

group, and a unit B represented by the following formula:

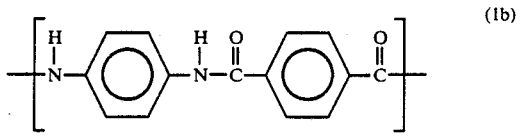
(1b)

and (B) a coating rubber composition containing natural rubber or a blend of natural rubber and isoprene rubber as a rubber component and 2.4–4.5 parts by weight of resorcin, 0.7–1.5 parts by weight of hexamethylenetetramine and 2–10 parts by weight of silica per 100 parts by weight of the rubber component and having a 100% modulus after vulcanization of 35–50 kg/cm$^2$.

BRIEF DESCRIPTION OF THE DRAWINGS

The invention will be described with reference to the accompanying drawings, wherein:

FIG. 1 is a graph showing a change of retention of strength due to heat aging at 150° C. in aromatic copolyamide fiber according to the invention when RH silica compounded rubber is used as a coating rubber for the ply and in aromatic polyamide fiber according to the comparative example using the same coating rubber;

FIG. 2 is a graph showing a change of retention of strength due to fatigue against compressive strain instead of the heat aging of FIG. 1; and FIG. 3 is a graph showing a change of adhesion index of aromatic copolyamide fiber to rubber as a contour line when varying amounts of hexamethylenetetramine and resorcin in RH silica compounded rubber composition.

DESCRIPTION OF THE PREFERRED EMBODIMENT

According to the invention, the aromatic copolyamide is produced by a method disclosed, for example, in Japanese Patent laid open No. 60-110,918, and consists of the above mentioned units A and B. In the unit A, the three benzene nuclei may be unsubstituted or may be partially or wholly substituted with an alkyl group having a carbon number of 1-3. Particularly, the aromatic copolyamide is preferable to be an aromatic polyetheramide having a unit represented by the following unit as the unit A:

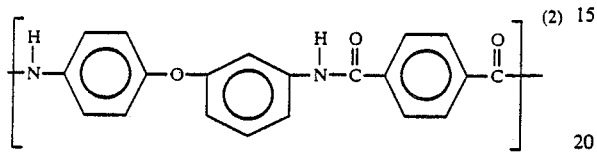
(2)

When using the above mentioned aromatic copolyamide fiber, the innermost ply located inward the tire among plural carcass plies is apt to produce CBU (cord breaking-up) due to compressive fatigue of the shoulder portion in the tire. Furthermore, since the adhesion property to the coating rubber is originally poor, the adhesion breakage at the boundary between the cord and rubber is apt to be caused at heat build-up position of the tire, so that there is a problem in the service durability of the tire.

This is considered due to the fact that since the aromatic polyamide fiber is high in the orientation and crystalinity, the high tensile properties are obtained, but the resistance to compressive strain is weak and the adhesion property is poor. In order to solve the problem on the compressive strain, it is expected that aromatic copolyamide fibers having flexible ether bond in their molecule are effective, but such fibers are also poor in the adhesion to rubber likewise the aromatic polyamide fiber.

According to the invention, it has been found that the problem on the above adhesion property can unexpectedly and advantageously be solved by adopting resorcin/hexamethylenetetramine/silica compounding system (hereinafter merely referred to as RH silica system). That is, by using the RH silica system, not only the adhesion property of the aromatic copolyamide fiber to rubber can considerably be improved, but also the heat resistant adhesion property can be improved and the reduction of tensile strength of the cord during the running of the tire can be made small. On the contrary, if the RH silica system is applied as a coating rubber to the ply composed of the aromatic polyamide fiber cord, the initial adhesion force of the coating rubber is improved, but the tensile strength of the cord is considerably reduced during the running of the tire and the service durability is insufficient.

This fact is concretely shown in FIGS. 1 and 2. FIG. 1 shows the change of retention of strength in the aromatic polyetheramide fiber and the aromatic polyamide fiber due to heat aging at 150° C. with the lapse of time when using the RH silica system as a coating rubber for the ply. As seen from FIG. 1, the aromatic polyetheramide fiber is very small in the reduction of retention of strength, while the aromatic polyamide fiber is conspicuous in the reduction of retention of strength. FIG. 2 shows the fatigue resistance against compressive strain, from which it is obvious that the aromatic polyetheramide fiber is superior in the fatigue resistance. Such advantages of the aromatic polyetheramide fiber as compared with the aromatic polyamide fiber are naturally based on the difference in the structure therebetween as well as the feature that the former is excellent in the resistance to chemicals as compared with the latter.

FIG. 3 shows an index of adhesion of the RH silica system coating rubber to the aromatic polyetheramide fiber cord (the adhesion force is 100 when the rubber adhered to the cord is 100% after the peeling adhesion test. The larger the numerical value, the better the adhesion property.) as a contour line connecting equal adhesion indexes to each other by plotting to the amounts (part by weight) of hexamethylenetetramine and resorcin per 100 parts by weight of rubber component, wherein numeral affixed to each contour line represents a value of adhesion index. Moreover, silica ($SiO_2$) does not substantially exert on the adhesion in an amount of 2-10 parts by weight per 100 parts by weight of the rubber component. When the amount is less than 2 parts by weight, the cord strength decreases during heat build-up, while when it exceeds 10 parts by weight, the Mooney viscosity becomes larger at unvulcanized state and the processability is considerably degraded.

As seen from FIG. 3, when the amount of silica is within the above range, it is necessary to use not less than 2.4 parts by weight of resorcin and not less than 0.7 part by weight of hexamethylenetetramine for obtaining high adhesion index. If the amount of resorcin exceeds 4.5 parts by weight, the Mooney viscosity of the unvulcanized rubber composition becomes too high and the scorching is apt to be caused and the calendering operation is degraded. While, if the amount of hexamethylenetetramine exceeds 1.5 parts by weight, 100% modulus of the vulcanized rubber composition can not be restricted to not more than 50 kg/cm$^2$.

Since the carcass ply is wound around the bead core from inside toward outside as mentioned above, the turnup end of the carcass ply is subjected to a large repeated stress during the rotation of the tire. Since such a repeated stress is very large in large size, heavy duty radial tires, particularly airplane tires, cracks are apt to be produced from the turnup end and then grow to decrease the service durability of the tire. The latter case is a serious problem in this type of the tire.

However, it has been confirmed that the problem of occurrence and growth of cracks in the turnup end of the carcass ply results from a modulus of elasticity at 100% elongation, i.e. 100% modulus of the coating rubber for the carcass ply. That is, the coating rubber is not durable to the repeated stress when the 100% modulus is less than 35 kg/cm$^2$. In this connection, it has been found that even if the initial adhesion force between rubber and cord becomes higher, the reduction of service durability due to such rubber breakage can not be prevented in use of the tire.

When the 100% modulus of the coating rubber exceeds 50 kg/cm$^2$, the rubber itself can not absorb the shearing force produced between cord and rubber in the shoulder portion, and finally the rubber breakage occurs. Furthermore, the cords in the inner carcass ply at the shoulder portion are rendered into a compressed state just under loading and subjected to repeated strains of compression and expansion during the rotation of the tire, so that they are fatigued to cause CBU.

Although this fatigue can considerably be improved by using aromatic copolyamide fiber as a material for the cord, if the 100% modulus of the coating rubber becomes too high, the fatigue resistance of the aromatic copolyamide fiber cord is considerably degraded. From this point, it is necessary that the 100% modulus of the coating rubber is limited to not more than 50 kg/cm².

According to the invention, the coating rubber composition for carcass ply may contain carbon black, a softening agent such as aromatic oil, spindle oil or the like, an antioxidant, a vulcanization accelerator, an acceleration promoter such as stearic acid, zinc white or the like, a vulcanizing agent and so on in usually used amounts in addition to the RH silica system.

The invention will be described in detail with reference to the following examples and comparative examples.

EXAMPLES

The test methods used in the example were as follows:

(1) Crack length at ply end (index):

The crack length at the highest turnup end of the carcass ply was measured at some positions on the circumference of the tire cut after the running on a drum in an indoor test, and then the average value thereof was measured. The crack length is represented by an index according to the following formula:

Index of crack length at ply end (crack index) = average crack length $l$ of test tire/average crack length $l_c$ of Comparative tire C × 100%

The smaller the index value, the higher the durability of the bead portion.

(2) Separation length at shoulder portion:

The crack length produced in the shoulder portion was measured in each of circumferential and radial directions of the tire, and then the average value thereof was calculated. The separation length in shoulder portion is represented by an index according to the following formula:

Index of separation length in shoulder portion (separation index) = average crack length $M$ of test tire/average crack length $M_c$ of Comparative tire C × 100%

The smaller the index value, the higher the durability of the tire casing.

(3) Retention of cord strength:

$F_t/F_o \times 100\%$ $F_t$: tensile strength at rupture of cord in inner carcass ply at shoulder portion after the running on the durm.

$F_o$: tensile strength of cord in inner carcass ply at shoulder portion of a new tire.

The larger the numerical value, the higher the durability of the tire casing.

(4) Drum test:

The test tire inflated under a 100% internal pressure of 13.4 kg/cm² was run on a drum at a speed of 64.4 kg/hr (40 mile/hr) under a 100% load of 18,850 kg (41,500 LBS) over a distance of 5,000 km.

The test tires were radial tires for airplanes with a size of H46×18R20 and had the following condition:

Tire A (according to the invention): This tire comprised a carcass of two plies each containing cords with a strength of 18 g/D composed of aromatic polyetheramide fiber having the following rational formula:

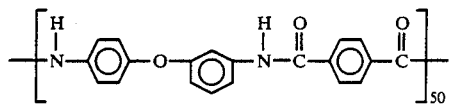

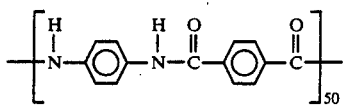

wherein the ply coating rubber was a rubber of RH silica system (R=3.0, H=1.0) shown in the following Table 1 and had 100% modulus of 45 kg/cm².

Tire B (Comparative tire): This tire was the same as the tire A except that aromatic polyamide fiber cord was used instead of the aromatic polyetheramide fiber cord.

Tire C (Comparative tire): This tire was the same as the tire A except that aromatic polyamide fiber cord was used instead of the aromatic polyetheramide fiber cord and the ply coating rubber was a rubber of non-RH silica system shown in the following Table 2.

Tire D (according to the invention): This tire was different from the tire A in a point of R=2.4 in Table 1.

Tire E (Comparative tire): This tire was different from the tire A in a point of R=2.0 in Table 1.

Tire F (according to the invention): This tire was different from the tire A in two points of R=4.0, H=1.5 in Table 1 and 100% modulus of 50 kg/cm².

Tire G (Comparative tire): This tire was different from the tire A in two points of R=5.0, H=2.0 in Table 1 and 100% modulus of 60 kg/cm².

TABLE 1

| Rubber of RH silica system | |
|---|---|
| | part by weight |
| Natural rubber | 100 |
| Carbon black | 40 |
| Silica | 5 |
| Resorcin (R*¹) | 3 |
| Stearic acid | 2 |
| Zinc white | 8 |
| Hexamethylenetetramine (H*²) | 1 |
| Vulcanization accelerator NOBS | 0.6 |
| Sulfur | 6 |
| Antioxidant | 0.4 |
| Retardar (scorch preventing agent) | 0.4 |

*¹R = part by weight of resorcin per 100 parts by weight of rubber component
*²H = part by weight of hexamethylenetetramine per 100 parts by weight of rubber component

TABLE 2

| Rubber of non-RH silica system | |
|---|---|
| | part by weight |
| Natural rubber | 100 |
| Carbon black | 50 |
| Stearic acid | 2 |
| Zinc white | 8 |
| Vulcanization accelerator NOBS | 0.6 |
| Sulfur | 5 |
| Antioxidant | 0.4 |
| Retardar | 0.4 |

The results of the tire cut after the indoor drum test over 5,000 km are shown in the following Table 3.

TABLE 3

|  | Example 1 | Comparative 1 | Comparative 2 | Example 2 | Comparative 3 | Example 3 | Comparative 4 |
|---|---|---|---|---|---|---|---|
| Tire | A | B | C | D | E | F | G |
| Fiber for cord | PEA*1 | PA*2 | PA | PEA | PEA | PEA | PEA |
| R*3 | 3.0 | 3.0 | — | 2.4 | 2.0 | 4.0 | 5.0 |
| H*4 | 1.0 | 1.0 | — | 1.0 | 1.0 | 1.5 | 2.0 |
| Crack index | 10 | 10 | 100 | 15 | 70 | 10 | 10 |
| Separation index | 0 | 0 | 100 | 0 | 60 | 10 | 75 |
| Retention of cord strength | 95 | 65 | 60 | 95 | 90 | 95 | 85 |

*1 PEA = aromatic polyetheramide fiber
*2 PA = aromatic polyamide fiber
*3 R = part by weight of resorcin per 100 parts by weight of rubber component
*4 H = part by weight of hexamethylenetetramine per 100 parts by weight of rubber component As shown in Examples and Comparative Examples, the heavy duty radial tires comprising a carcass ply composed of aromatic copolyamide fiber cord and a natural rubber series coating rubber composition having an RH silica system of particular component ratio and 100% modulus after vulcanization of 35–50 kg/cm² considerably improve resistance to fatigue due to compressive strain and adhesion property, particularly thermal resistant adhesion property as compared with the case of the conventional tire using the aromatic polyamide fiber cord, whereby the service durability of the tire can be improved remarkably.

What is claimed is:

1. A heavy duty pneumatic radial tire comprising a tread portion, a pair of sidewall portions extending between both shoulders of the tread portion, a pair of bead portions each formed at the inner end of the sidewall portion, and a reinforcement consisting of a carcass composed of at least two plies, each containing cords arranged in the radial direction of the tire, wherein said plies are wound around the bead portion from the inside toward the outside, and a breaker surrounding the carcass, wherein each of said carcass plies is composed of:
   (A) cords, each made from a fiber of an aromatic copolyamide, wherein said aromatic copolyamide is an aromatic polyetheramide, having as a unit A, a unit represented by formula (2):

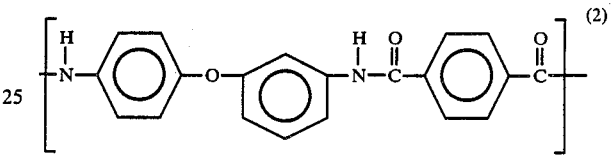

and a unit B represented by the following formula (1b):

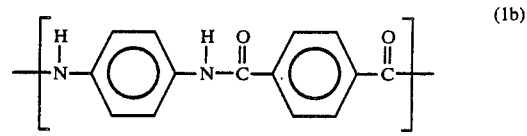

and
   (B) a coating rubber composition consisting essentially of natural rubber or a blend of natural rubber and isoprene rubber as a rubber component and 2.4–4.5 parts by weight of resorcin, 0.7–1.5 parts by weight of hexamethylene-tetramine and 2–10 parts by weight of silica per 100 parts by weight of the rubber component, and having a 100% modulus after vulcanization of 35–50 kg/cm².

* * * * *